United States Patent Office 3,030,432
Patented Apr. 17, 1962

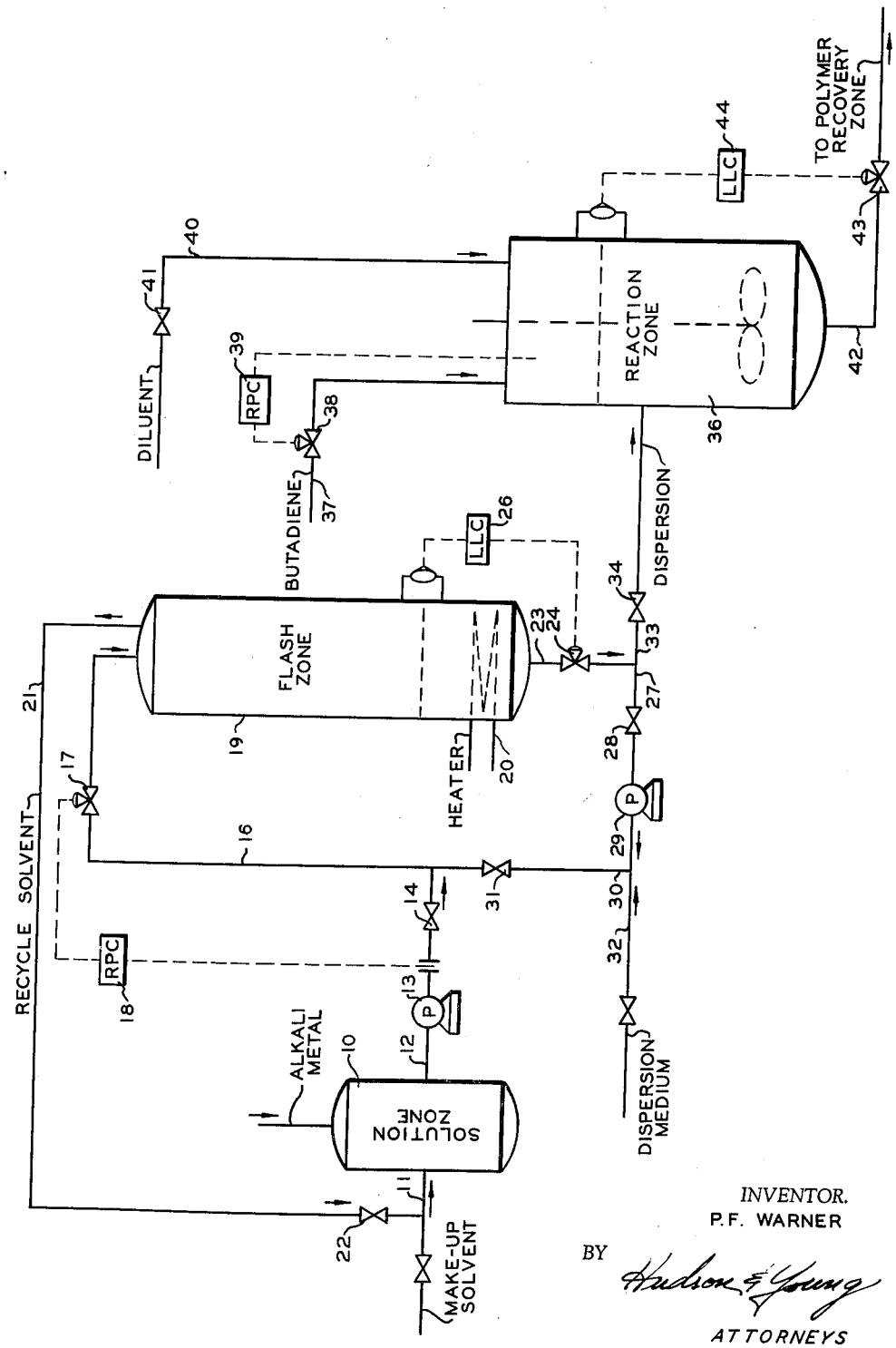

3,030,432
POLYMERIZATION OF CONJUGATED DIENES
Paul F. Warner, Phillips, Tex., assignor to Phillips Petroleum Company, a corporation of Delaware
Filed Mar. 28, 1957, Ser. No. 649,203
6 Claims. (Cl. 260—680)

This invention relates to a method of polymerizing conjugated dienes with an alkali metal catalyst. In another aspect it relates to a method of employing an ultra-fine alkali metal dispersion as a catalyst in the manufacture of liquid polymers of conjugated dienes. In one of its more specific aspects this invention relates to the formation of liquid polymers of butadiene using an ultra-fine sodium catalyst.

Polymerization of conjugated dienes, particularly 1,3-butadiene, in the presence of an alkali metal catalyst is a well developed and highly useful process. Production of liquid polymers by this method, however, has heretofore encountered the problem of gel formation which reduces the homogeneity of the polymer and, therefore, restricts the number of useful applications for the product. The formation of gel or solid polymer of this nature necessitates the use of expensive filtration equipment and also reduces the yield of useful product since the gel portion must generally be discarded. Liquid polymer containing any appreciable amount of gel is difficult to process as the gel tends to plug filters and accumulate in processing equipment.

I have discovered a method of polymerizing conjugated dienes using alkali metal catalyst in a manner which results in an unexpected decrease in gel content and improved filterability of the polymer product. According to my invention the polymerization is carried out in the presence of an alkali metal catalyst of different surface characteristic and much smaller average particle size than has heretofore been employed in reactions of this type. The catalyst employed in my invention is prepared by dissolving an alkali metal in a suitable solvent, such as liquid ammonia or alkyl amines having from 1–4 carbon atoms per molecule, and subsequently precipitating the alkali metal in an inert dispersion medium by mixing the solution therewith and flashing the solvent. Particles thus formed are angular as contrasted to the spherical catalysts of the prior art. I have found that when practicing the process of my invention, improved liquid polymers of butadiene can be made having filter rates as high as twice those previously possible with conventional catalyst dispersions.

It is an object of my invention to provide a method of making an improved polymer of a conjugated diene. It is another object of my invention to provide a liquid polymer of butadiene with reduced gel content and improved filterability. Still another object is to provide a method of employing an ultra-fine alkali metal dispersion as a catalyst for polymerization of conjugated dienes. Other objects, advantages, and features will become apparent to those skilled in the art from the following description, claims, and drawing which depicts schematically the flow of materials according to one embodiment of my invention.

Formation of liquid polymers of conjugated dienes, especially of 1,3-butadiene, isoprene and 2,3-dimethylbutadiene is a process well known in the art. For example, it is customary to polymerize a 1,3-butadiene in the presence of a sodium catalyst dispersion in a suitable diluent under controlled reaction conditions. The 1,3-butadiene should have a high degree of purity, preferably comprising at least 98 weight percent of the total polymerizable feed material. The 1,3-butadiene is then polymerized in the presence of a finely divided alkali metal catalyst, preferably sodium or potassium, and with a suitable diluent such as benzene, heptane, isobutane, propane, normal butane, normal pentane, isopentane, and the like. Care is taken to exclude oxygen from the reaction as its presence is harmful.

When carrying out the reaction the hydrocarbon diluent is charged to a reactor equipped with agitation means along with finely divided alkali metal catalyst suspended in a suitable dispersion medium, such as benzene, toluene, xylene, or other hydrocarbon diluents as mentioned above. A suitable reaction temperature in the range of about 60–110° C. is obtained and sufficient monomer is introduced to provide a concentration thereof in the solvent of about 0.03 to 0.15 pound per pound of solvent. After about 5–30 minutes the reaction is initiated, as evidenced by an increase in temperature and drop in pressure, and additional monomer is charged at a rate of about 0.03 to 0.4 pound of monomer per pound of solvent. The reaction is continued at a temperature below the melting point of the alkali metal as additional catalyst is charged until the desired concentration of polymer in the polymer-solvent mixture is reached. This is usually in the range of about 25–40 percent by weight of the polymer. The concentration of polymer generally should not exceed 50 weight percent. The amount of catalyst employed ordinarily does not exceed 2 parts by weight of alkali metal per 100 parts total butadiene feed charged and is preferably in the range of about 0.5 to 1.5 parts per 100 parts of the total butadiene.

In general, the time required to carry out this polymerization exclusive of the initial induction period does not exceed 4 to 8 hours and is preferably below 4 hours. The reactor effluent is treated to recover the polymer by processes wherein the unchanged alkali metal and reactive organo-metallic compounds are removed or converted to inactive materials which do not produce deleterious effects on the product. One such treating method comprises separating the liquid from solid particles by decantation, filtration, or the like and treating the solution with a small amount of water to destroy any free alkali metal catalyst that is present and then with an excess of carbon dioxide. Removal of precipitate by filtration is then normally desirable and the polymer can be recovered from solution by vaporizing the solvent, whereupon a substantially colorless, or slightly colored, transparent, liquid product is obtained.

This process is more fully described in U.S. Patent 2,631,175, issued March 10, 1953 to W. W. Crouch.

The process of this invention is also applicable to other polymerizations in which 1,3-butadiene is the essential ingredient. For example, it is applicable to the polymerization of 1,3-butadiene with materials copolymerizable therewith, such materials including other conjugated dienes such as isoprene, piperylene, 2,3-dimethylbutadiene, and the like, and vinyl compounds such as styrene, methyl substituted styrenes, vinyl naphthalenes, vinyl pyridines and the like. In all such polymerizations the major polymerizable ingredient is 1,3-butadiene and this component is present in an amount which exceeds 50 weight percent of the monomeric material.

Catalyst dispersions for polymerization of the type above described have previously been prepared by means adapted to disperse molten alkali metal as fine droplets in a dispersion medium. Such dispersion means have taken the form of a high speed stirrer having a special head with numerous shearing surfaces or a pump which forces the molten metal through a small orifice causing it to impinge on a metal plate immersed in the dispersion medium. Dispersions prepared by means of this type have at least a few harmful large catalyst particles and a practical lower limit of catalyst average particle size in the order of about 5–10 microns. The catalyst employed in the practice of my invention is quite uniform and generally has an average particle size in the order of about two microns or less and preferably about one micron and below. Catalyst dispersions of larger particle size, in the order of about 5–10 microns and above, can, however, be produced by precipitation from solution, if desired. Catalyst dispersions of this type have advantages in the process of my invention over dispersions of comparable particle size prepared by the molten metal processes, possibly because of the increased surface area available in the precipitated catalyst. These precipitated alkali metal particles appear to be quite porous and irregular in shape when viewed under a high-power microscope. Catalyst particles prepared from molten metal, on the other hand, are spherical.

The catalyst for use in my invention is prepared by dissolving an alkali metal, preferably sodium or potassium, in a solvent which has a boiling point below the melting point of the metal. Such solvents are liquid ammonia, monoethylamine and other alkylamines having not over four carbon atoms per molecule. Higher boiling solvents can be used by employing subatmospheric pressures when separating the solvent from the dispersion. The alkali metal solution thus formed is blended with an inert dispersion medium, preferably a hydrocarbon solvent such as previously described as being suitable for use in the polymerization reaction. A good dispersion medium is a mixture of highly branched paraffinic hydrocarbons having a flash point of about 130 to 200° F. and above and boiling in the range of of about 300 to 500° F. Such a material is commercially available under the trade name "Soltrol." The blended material is flashed to remove the solvent, that is the ammonia or alkylamine; and the catalyst is precipitated in the dispersion medium.

The concentration of catalyst in the solvent can vary from about 0.1 to 20 weight percent although ordinarily is less than 10 weight percent, and preferably, for use in my invention, concentrations in the order of about 1–2 weight percent are desired. Higher concentrations of alkali metal result in larger particles being formed, for example in the range of about 5–10 or 20 microns. Solutions containing about 1–2 weight percent sodium form catalyst having an average particle size of less than two microns in diameter and a substantial portion of particles are less than one micron in diameter. The amount of dispersion medium employed can vary widely and should be sufficient to provide an easily pumpable slurry. For example, dispersions of about 25 weight percent sodium in "Soltrol" are satisfactory. A catalyst dispersion thus formed is introduced to the polymerization reactor substantially as described above for conventional mass polymerization. To further describe the process of my invention a specific embodiment is shown in the accompanying drawing as described below.

Sodium is introduced to solution zone 10 and liquid ammonia is added through line 11. A solution of ammonia and sodium formed in zone 10 is drawn through line 12 by pump 13 and passed through valve 14 into line 16 wherein the solution becomes admixed with a recycled dispersion comprising precipitated sodium particles and hydrocarbon dispersion medium. Suitable pressures and temperatures employed in this process depend upon the solvent and dispersion medium employed. However, for a sodium solution in liquid ammonia and a dispersion medium of highly branched paraffinic hydrocarbons having a flash point of about 130° F., a suitable pressure at the point of admixture in line 16 is about 200 pounds per square inch gage. The mixture passes through reducing valve 17 controlled automatically by pressure recorder controller 18 in response to pressure indicated in line 12. The mixture thus passes to flash zone 19 having heating means 20 controlling the temperature, in this particular case in the range of about 70–150° F., in the bottom of zone 19. Ammonia is flashed and recycled to the solution zone 10 from zone 19 through line 21 and valve 22 mixing with fresh liquid ammonia in line 11.

The sodium is thus precipitated in the dispersion medium forming a dispersion having an average catalyst particle size of about one micron in diameter. The dispersion leaves flash zone 19 through line 23 and valve 24 controlled by liquid level controller 26. Recycled dispersion passes through line 27 and valve 28 and is forced by pump 29 through line 30 and valve 31 into line 16 wherein the dispersion is mixed with the sodium-ammonia solution as above described. Fresh dispersion medium is added to the recycle line 30 through line 32.

The catalyst dispersion thus produced passes through line 33 and valve 34 to polymerization reaction zone 36. Butadiene is added to zone 36 through line 37 and valve 38 regulated by pressure recorder-controller 39 to maintain a constant pressure within the reaction zone. Diluent is added to the zone 36 through line 40 and valve 41. The reaction diluent and the dispersion medium can be the same material although this is not necessary as long as they are compatible. For example, a suitable diluent in this embodiment is normal heptane.

Reactor effluent leaves by line 42 through valve 43 controlled by liquid level controller 44 and passes to subsequent polymer recovery zones which can be operated in any suitable manner to deactivate the remaining catalyst and separate substantially pure liquid polybutadiene. Polymer thus produced has reduced gel content and is thereby much improved over products of this type available from processes of the prior art.

To further describe my invention and its advantages the following example is presented which should be interpreted as exemplary only and not as unduly limiting my invention.

EXAMPLE I

A solution of about two weight percent sodium in liquid ammonia was formed in a carbon steel cylinder. The solution thus formed was pumped from the cylinder into a line containing a recycle dispersion of precipitated sodium and a highly branched paraffinic hydrocarbon having a flash point of 133° F. and an initial boiling point of 350° F. This mixture was then passed through a pressure release valve set at 200 pounds per square inch gage, and into a three-neck flask. Ammonia was driven out of the mixture by applying heat to the flask and a sodium precipitate formed. The liquid ammonia was only slightly miscible with the dispersion medium.

Dispersion from the three-neck flask was recycled by pumping it from the bottom of the flask through the pressure release valve thereby providing the means for mixing therewith the fresh sodium-ammonia solution. The average particle size of the sodium dispersion was about one micron. The temperature of the dispersion medium varied from about 70°–150° F.

A two gallon reactor was charged with approximately 0.75 gallon of dry normal heptane and heated to 200° F. The reactor was purged with nitrogen gas and then twice with butadiene vapor. Catalyst dispersion containing 18.5 grams of sodium was charged and butadiene was admitted to the reactor until the pressure reached 20 pounds per square inch gage. Butadiene flow was then shut off and the temperature was raised to about 220° F. to initiate the reaction. Then cooling water was turned on and the reactor temperature lowered to about 200° F. where it was maintained during the continuous part of the run. After the reaction began, butadiene was fed continuously at a rate of 1875 grams per hour. No heptane was fed to the reactor until it was about two-thirds full, e.g., the volume had increased by about 0.75 gallon. During the remainder of the run heptane was added continuously at a rate of about 1875 grams per hour producing an effluent containing about 50 weight percent polybutadiene.

Product was continuously withdrawn at such a rate as to maintain a constant level in the reactor. Conversion of butadiene was about 95 to 98 percent. Sodium catalyst dispersion was added at a rate of 15 grams of sodium per hour which produced a sodium concentration of about 0.8 weight percent based on the added butadiene. The catalyst was added intermittently every 30 minutes. Pressure in the reactor was maintained at 20 to 35 pounds per square inch gage during the continuous part of the run. Product was collected in three separate portions having a viscosity in Saybolt furol seconds at 100° F. of 468, 681 and 826 respectively. These viscosity values are for the solvent-free products.

The liquid polybutadiene thus prepared was compared for gel content with liquid butadiene polymers prepared in the presence of sodium catalyst dispersions formed by conventional prior art process. These sodium dispersions were formed by admitting molten sodium to a dispersion chamber containing a dispersion medium. The dispersion chamber containing a motor driven gear pump adapted to circulate the contents of the dispersion chamber through the gear pump and through a nozzle against a target plate so as to continually break up and disperse the globules of molten sodium being mixed with the dispersion medium. Apparatus of this type is described in copending application Serial No. 478,618, filed December 30, 1954, by Paul F. Warner, now U.S. Patent 2,918,435. Catalyst dispersions having an average particle size ranging from about 5 to 40 microns in diameter were thus produced and used to prepare liquid polybutadiene in separate runs. The product of each run was collected in three separate portions and the portions were blended for the test indicating gel content.

Gel content for the speciments of liquid polybutadiene was determined by a filterability test which was run as follows:

The polybutadiene was diluted with normal heptane to produce a 40 weight percent solution of polymer, and the volume filtered in 600 seconds was recorded. The solution was added to the filter in 50 milliliter portions and the amount remaining unfiltered at the end of the filter period was measured. The filter comprised a 5½ centimeter Buchner funnel fitted with a No. 42 Whatman paper. The filter was attached to a suction flask wherein an absolute pressure was 100 millimeters of mercury which resulted in a differential pressure of about 585 millimeters of mercury. The results of the filterability test for each of the above described runs is reported in Table I below.

*Table I*

| Run | Catalyst Size, Microns | | Catalyst Preparation Method | Filterability ml./600 sec. |
|---|---|---|---|---|
| | Range | Average | | |
| 1 | | 1 | Solution | 75 |
| 2 | 1-25 | | Molten | 23 |
| 3 | 1-10 | 6 | ---do--- | 30 |
| 4 | 15-90 | 35 | ---do--- | 8 |
| 5 | 4-90 | 40 | ---do--- | 35 |

The viscosity of each of the above reported blends was such that little or no variation in filtration rates would result therefrom. Comparison of tests have shown that the above described filterability test is a good indication of gel content for a liquid polymer of this type. As shown by the above data, filterability for the liquid polymers produced by process of my invention is more than twice as great as for the liquid polymers polymerized in the presence of catalyst dispersions prepared from the molten metal. An improvement of this degree is quite remarkable, especially in view of the fact that several catalyst dispersions employed for comparison basis contained at least some catalyst particles in the 1 to 2 micron range. The catalyst dispersion employed in run No. 3 represents about the smallest possible particle size which can be obtained by the molten metal dispersion process.

The products made by the method of this invention are particularly useful as additives in drying oils, coatings, adhesives and the like. The products are also useful as tackifiers and/or plasticizers for both synthetics and natural rubbers. Because of reduced gel content and increased filterability, these polymers are readily processable, and thereby greatly enhanced for commercial acceptability among manufacturers.

I claim:

1. An improved process for forming liquid polymer of conjugated diene which comprises forming an ultra-fine catalyst dispersion of alkali metal by dissolving alkali metal in a solvent selected from the group consisting of liquid ammonia and alkyl amines having from 1 to 4 carbon atoms per molecule, blending the solution thus formed with an inert liquid hydrocarbon diluent, and flashing said solvent at a temperature below the melting point of said alkali metal thus leaving a dispersion of alkali metal in said hydrocarbon diluent, introducing said dispersion of alkali metal in hydrocarbon diluent and conjugated diene hiving 4 to 6 carbon atoms per molecule to a common reaction zone, polymerizing said conjugated diene under polymerization conditions for alkali metal-catalyzed polymerization, and recovering a liquid polymer from said reaction zone.

2. An improved method in preparing polybutadiene which comprises polymerizing butadiene in an inert liquid hydrocarbon diluent in the presence of a sodium dispersion obtained by dissolving sodium in a solvent selected from the group consisting of liquid ammonia and alkyl amines having from 1 to 4 carbon atoms per molecule, blending the solution thus formed with inert liquid hydrocarbon diluent, and flashing said solvent at a temperature below the melting point of said sodium thus leaving said dispersion of finely divided sodium in said hydrocarbon diluent.

3. An improved process for forming liquid polymer of conjugated diene which comprises passing conjugated diene having from 4 to 6 carbon atoms per molecule to a polymerization zone containing an inert hydrocarbon diluent, contacting said conjugated diene under polymerization conditions with a sodium dispersion having an average particle size of about 1 to 2 microns, said sodium dispersion having been formed by dissolving sodium in a solvent selected from the group consisting of liquid ammonia and alkyl amines having from 1 to 4 carbon atoms per molecule, blending this solution thus formed with an inert liquid hydrocarbon diluent, and flashing said solvent at a temperature below the melting point of said sodium thus leaving said dispersion of sodium in hydrocarbon diluent, and recovering the liquid polymer from said polymerization zone.

4. A method of forming a sodium catalyzed liquid polybutadiene having improved filterability which comprises passing butadiene to a polymerization zone; passing an inert hydrocarbon liquid diluent to said polymerization zone; contacting said butadiene in said polymerization zone under polymerization conditions with an ultra-fine dispersion of sodium catalyst, said catalyst having an average particle size of about 1 to 2 microns and having been formed by dissolving sodium to a concentration of about 1 to 2 weight percent in liquid ammonia, blending under pressure said sodium solution thus formed with an inert liquid hydrocarbon diluent, and flashing said solvent from the resultant mixture by reducing the pressure and adding heat at a temperature below the melting point of said sodium thereby forming said ultra-fine dispersion of sodium in said diluent blended therewith; and recovering from said reaction zone an improved liquid polymer of butadiene.

5. A method of forming a sodium catalyzed liquid polybutadiene having improved filterability which comprises passing butadiene to a polymerization zone; passing an inert hydrocarbon liquid diluent to said polymerization zone; contacting said butadiene in said polymerization zone under polymerization conditions with an ultra-fine dispersion of sodium catalyst, said catalyst having an average particle size of about 1 to 2 microns and having been formed by dissolving sodium to a concentration of about 1 to 2 weight percent in monomethylamine, blending under pressure said sodium solution thus formed with an inert liquid hydrocarbon diluent, and flashing said solvent from the resultant mixture by reducing the pressure and adding heat at a temperature below the melting point of said sodium thereby forming said ultra-fine dispersion of sodium in said diluent blended therewith; and recovering from said reaction zone an improved liquid polymer of butadiene.

6. A process for preparing an improved liquid polymer of 1,3-butadiene which comprises (1) introducing 1,3-butadiene to a reaction zone; (2) passing a sodium catalyst dispersed in an inert liquid hydrocarbon diluent to said reaction zone, said sodium catalyst having an average particle size of about 0.5 to 2 microns in diameter and having been formed by dissolving sodium to a concentration of less than about 2 weight percent in liquid ammonia, mixing the solution thus formed with said hydrocarbon diluent, and flashing said solvent at a temperature below the melting point of the sodium thereby precipitating the sodium in said diluent forming an easily pumpable dispersion; (3) forming a polymerization mixture in said reaction zone comprising 1,3-butadiene, polybutadiene, hydrocarbon diluent and said sodium catalyst in an amount not exceeding 2 parts by weight per 100 parts total butadiene feed charged, (4) maintaining the resulting reaction mixture at 60 to 110° C. while continuing the polymerization with addition of butadiene until a polymer-solvent mixture is formed containing not in excess of 50 weight percent of polybutadiene, and (5) recovering a clear low-color liquid polybutadiene free from solid polymer in suspended or dissolved form.

References Cited in the file of this patent
UNITED STATES PATENTS

| | | |
|---|---|---|
| 2,209,746 | Ebert et al. | July 3, 1940 |
| 2,631,175 | Crouch | Mar. 10, 1953 |

FOREIGN PATENTS

| | | |
|---|---|---|
| 338,534 | Great Britain | Nov. 17, 1930 |
| 144,585 | Switzerland | Mar. 16, 1931 |